(12) United States Patent
Grishauge et al.

(10) Patent No.: US 11,878,358 B2
(45) Date of Patent: Jan. 23, 2024

(54) ALIGNMENT TOOL, CUTTING ARRANGEMENT AND METHOD FOR TREATMENT OF A WORKPIECE

(71) Applicant: Siemens Gamesa Renewable Energy A/S, Brande (DK)

(72) Inventors: Nikolai Bak Grishauge, Nibe (DK); John Nielsen, Brovst (DK); Per Nielsen, Vodskov (DK); Jacob Madsen, Fredericia (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/877,389

(22) Filed: Jul. 29, 2022

(65) Prior Publication Data

US 2022/0379392 A1 Dec. 1, 2022

Related U.S. Application Data

(62) Division of application No. 16/494,104, filed as application No. PCT/EP2018/050190 on Jan. 4, 2018, now Pat. No. 11,484,957.

(30) Foreign Application Priority Data

Mar. 17, 2017 (DE) ...................... 10 2017 204 521.3

(51) Int. Cl.
*B23D 51/02* (2006.01)
*F03D 80/50* (2016.01)
(Continued)

(52) U.S. Cl.
CPC ............ *B23D 51/025* (2013.01); *B25B 1/205* (2013.01); *B25B 5/14* (2013.01); *B25B 11/007* (2013.01);
(Continued)

(58) Field of Classification Search
CPC ..... B23D 51/025; F03D 1/0675; B26B 29/06; B25B 5/14
See application file for complete search history.

(56) References Cited

U.S. PATENT DOCUMENTS 709,776 A * 9/1902 Kelley ................... A41H 3/002
33/566
2,813,710 A * 11/1957 Angle .................... B23K 7/105
33/DIG. 1

(Continued)

FOREIGN PATENT DOCUMENTS

CN 201151585 Y 11/2008
CN 102046341 A1 5/2011
(Continued)

OTHER PUBLICATIONS

"Amazon micro wind turbine" accessed Apr. 10, 2021, at https://www.amazon.com/0-1V-5-5V-100-6000RPM-Vertical-Turbines-Generator . . . (see full URL in document). Date product was first available; shown in printout was "Nov. 1, 2018" (Year 2018).
(Continued)

*Primary Examiner* — Sean M Michalski
(74) *Attorney, Agent, or Firm* — Schmeiser, Olsen & Watts LLP

(57) ABSTRACT

A method for treatment using a cutting arrangement includes providing a rotor blade of a wind turbine and attaching an alignment tool to the rotor blade. The alignment tool includes at least one fixation means for fixing the alignment tool to proximate a trailing edge of the rotor blade that is a structure attachable to a first surface and a second opposing surface of the rotor blade. The alignment tool further includes at least one guiding structure operably connected to the fixation means that is configured to embrace the leading edge of the rotor blade and includes at least one groove or at least one edge that provides guidance for a cutting edge
(Continued)

Figure 1:
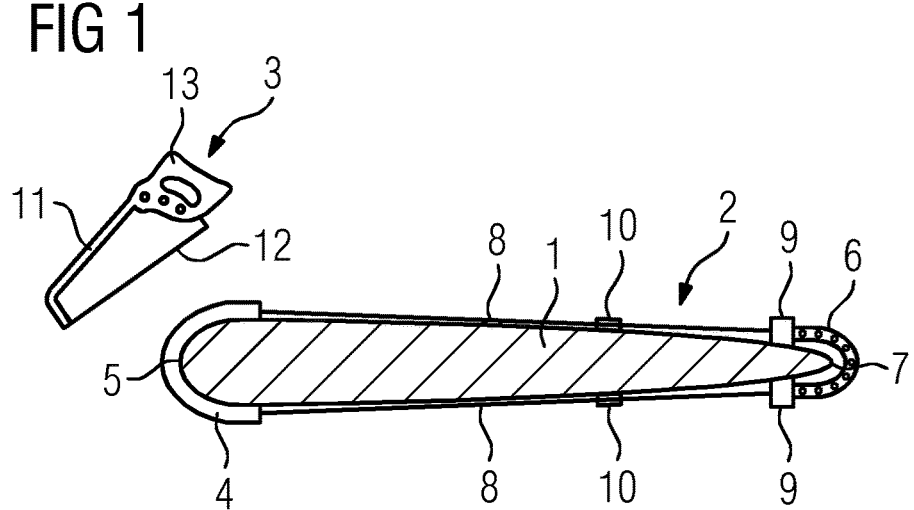

of a cutting apparatus. The method includes treating the rotor blade using the cutting apparatus, in which the cutting edge of the cutting apparatus is guided by the at least one guiding structure of the alignment tool.

8 Claims, 3 Drawing Sheets

(51) Int. Cl.
    *B25B 5/14*           (2006.01)
    *B25B 11/00*         (2006.01)
    *B26B 29/06*         (2006.01)
    *F03D 1/06*          (2006.01)
    *B25B 1/20*          (2006.01)

(52) U.S. Cl.
    CPC ............ *B26B 29/06* (2013.01); *F03D 1/0675* (2013.01); *F03D 80/50* (2016.05); *F05B 2230/80* (2013.01)

(56) References Cited

U.S. PATENT DOCUMENTS

| | | | | |
|---|---|---|---|---|
| 2,908,300 A * | 10/1959 | Hahn | B27G 5/02 269/41 |
| 3,590,891 A * | 7/1971 | Guglielmo | B27G 5/026 83/762 |
| 3,782,235 A * | 1/1974 | Curcio | B27G 5/02 83/762 |
| 3,816,919 A * | 6/1974 | Portnoy | A61B 17/32 606/152 |
| 4,057,898 A * | 11/1977 | Piosky | B25H 7/02 33/563 |
| 4,095,500 A * | 6/1978 | Rouse | B27G 5/026 83/762 |
| 4,096,631 A * | 6/1978 | Ward | B26F 1/3853 30/294 |
| 4,096,777 A * | 6/1978 | Adams | B27G 5/02 83/762 |
| 4,158,523 A * | 6/1979 | Schotzko | B23B 47/288 83/761 |
| 4,188,723 A * | 2/1980 | Fuchs | E04F 21/32 30/296.1 |
| 4,195,827 A * | 4/1980 | Lyman | B23D 51/025 269/2 |
| 4,250,625 A | 2/1981 | Reif | |
| 4,381,854 A * | 5/1983 | Bruner | B23K 7/10 266/58 |
| 4,399,197 A * | 8/1983 | Vandell | B23K 7/006 428/584 |
| 4,508,319 A * | 4/1985 | Tappan | E04H 17/20 47/33 |
| 4,593,887 A * | 6/1986 | Peterson | B23K 7/10 266/58 |
| 4,618,378 A * | 10/1986 | Huckaby | B23K 7/10 148/201 |
| 4,622,746 A * | 11/1986 | Appelson | G09F 19/228 47/33 |
| 4,850,763 A * | 7/1989 | Jack | B23Q 9/0014 408/91 |
| D319,794 S * | 9/1991 | Elkins | D8/71 |
| 5,287,825 A | 2/1994 | Herron | |
| 5,323,962 A * | 6/1994 | Jassby | B23K 37/0533 238/10 R |
| 5,403,133 A * | 4/1995 | Kim | B23K 9/028 408/78 |
| 5,427,122 A * | 6/1995 | Hamilton | A45D 24/36 132/214 |
| 5,511,316 A * | 4/1996 | Fischer | B43L 13/201 33/562 |
| 5,557,996 A * | 9/1996 | Reber | B26B 29/06 30/292 |
| 5,946,999 A * | 9/1999 | Kahn | B26B 29/06 83/886 |
| 6,216,354 B1 * | 4/2001 | Carbone | B43L 13/20 33/565 |
| 6,829,833 B2 * | 12/2004 | Langman | B26B 29/06 33/32.2 |
| 7,003,893 B1 * | 2/2006 | Phuly | B23K 9/0286 33/561.1 |
| 7,273,333 B2 * | 9/2007 | Buttrick, Jr. | B23Q 11/001 408/1 R |
| 7,536,803 B2 * | 5/2009 | Samuels | B26B 15/00 83/455 |
| 7,673,394 B2 * | 3/2010 | Ruppe, III | B26B 29/06 33/562 |
| 7,794,183 B2 * | 9/2010 | Wright | B23Q 11/0017 408/1 R |
| 8,171,642 B2 * | 5/2012 | Fritsche | B23Q 1/621 29/897 |
| 8,296,959 B1 * | 10/2012 | Brooks | B25H 7/005 33/21.3 |
| 2005/0252019 A1 * | 11/2005 | Gordon | B43L 13/20 33/566 |
| 2006/0027062 A1 * | 2/2006 | Whaley | B26B 29/06 83/13 |
| 2008/0181733 A1 * | 7/2008 | Wright | B23Q 9/0042 408/1 R |
| 2008/0202090 A1 | 8/2008 | Lovett et al. | |
| 2011/0100186 A1 | 5/2011 | Haas | |
| 2013/0139661 A1 * | 6/2013 | Wright | B65B 27/10 83/13 |
| 2015/0096420 A1 * | 4/2015 | Kloiber | B26D 7/0006 83/829 |
| 2016/0046088 A1 | 2/2016 | Haag | |
| 2017/0173762 A1 | 6/2017 | Chardonnet et al. | |
| 2017/0246753 A1 * | 8/2017 | Palmer | B26D 3/169 |
| 2018/0194031 A1 * | 7/2018 | Konop | B26D 7/025 |
| 2020/0130078 A1 * | 4/2020 | Grishauge | B25B 1/205 |

FOREIGN PATENT DOCUMENTS

| | | |
|---|---|---|
| CN | 102390000 A | 3/2012 |
| CN | 102689074 A | 9/2012 |
| CN | 104768885 A | 7/2015 |
| CN | 205437430 U | 8/2016 |
| CN | 106232299 A | 12/2016 |
| DE | 2349642 A1 | 4/1975 |
| EP | 2111742 A1 | 10/2009 |
| EP | 2634418 A2 | 9/2013 |
| EP | 3299156 A1 | 3/2018 |
| EP | 3504429 A1 | 7/2019 |
| EP | 3535490 A1 | 9/2019 |
| EP | 3536947 A1 | 9/2019 |
| EP | 3580014 A1 | 12/2019 |
| EP | 3633186 A1 | 4/2020 |
| GB | 2247205 A | 2/1992 |
| GB | 2434558 A | 8/2007 |
| JP | 2007307658 A | 11/2007 |
| WO | 2010007378 A1 | 1/2010 |
| WO | 2018060296 A1 | 4/2018 |
| WO | 2018060299 A1 | 4/2018 |
| WO | 2018114123 A1 | 6/2018 |
| WO | 2018219524 A1 | 12/2018 |

OTHER PUBLICATIONS

"Wind Turbine" accessed Apr. 10, 2021 at https://en.wikipedia.org/wiki/Wind_turbine; relevant date of the cited portion is from 2014. (Year: 2014).
International Search Report for application No. PCT/EP2018/050190 dated Jun. 6, 2018.

* cited by examiner

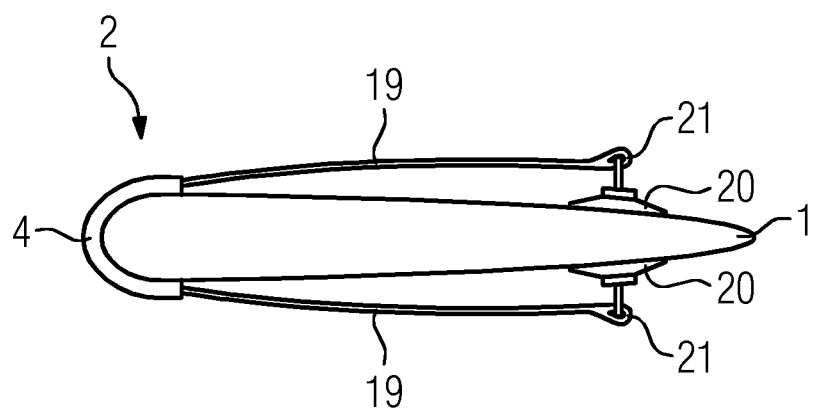
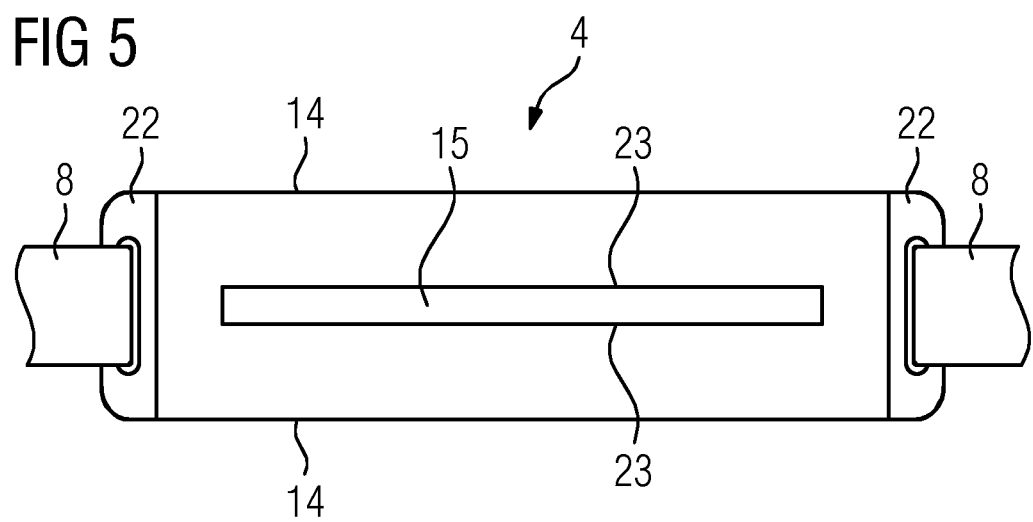

ALIGNMENT TOOL, CUTTING ARRANGEMENT AND METHOD FOR TREATMENT OF A WORKPIECE

CROSS-REFERENCE TO RELATED APPLICATIONS

This application is a divisional of Application Ser. No. 16/494,104, filed Sep. 13, 2019, and claims priority to PCT Application No. PCT/EP2018/050190, having a filing date of Jan. 4, 2018, based off of German Application No. 10 2017 204 521.3 having a filing date of Mar. 17, 2017, the entire contents all of which are hereby incorporated by reference.

FIELD OF TECHNOLOGY

The following relates to an alignment tool comprising a cutting apparatus with a cutting edge for a cutting arrangement for treatment of a workpiece, especially a rotor blade of a wind turbine.

BACKGROUND

Leading edges of wind turbine blades are protected against rain and erosion by providing a protection layer consisting of ductile and robust material to avoid for instance penetration of rain. However, due to the ductility and the robustness of the material, repair or replacement of the material is difficult due to fraying of the material during cutting. The fraying counteracts the necessity of providing precise cuts in the material for repair or replacement of damaged material at all areas of the wind turbine blade, which are covered by such a leading edge protection material, independently of the local geometry or contour of the rotor blade.

SUMMARY

An aspect relates to a respective tool that enables the conduction of such a repair or replacement procedure.

The solution according to the embodiments of the invention is that the alignment tool comprises at least one fixation means for fixing the alignment tool to the workpiece and at least one guiding structure to guide the cutting edge of the cutting tool.

The advantage of the solution according to the embodiments of the invention is that the alignment tool can be fixed on the workpiece providing guidance for the cutting edge of the cutting apparatus to enable precise cutting without the need to dismount the workpiece.

The alignment tool provides a guiding structure for the cutting edge of the cutting apparatus to enable precise and localised cuts in the workpiece. Also, the alignment tool provides a fixation means for fixation of the alignment tool on the workpiece. The fixation means enables reversible mounting of the alignment tool to the workpiece ensuring tight attachment of the guiding structure during for instance a cutting procedure.

Preferably, the alignment tool is continuously adaptable to size and contour of the workpiece. This allows to use the alignment tool on different areas of a workpiece exhibiting an uneven geometry or the alignment tool can be used to work on different workpieces which exhibit each a different geometry. For instance, if the workpiece is a rotor blade of a wind turbine, this provides the possibility to conduct the repair at any place of the rotor blade circumference, independently of the local diameter, the thickness, or the shape of the blade.

A typical embodiment of the invention may incorporate that the alignment tool comprises a flexible belt comprising the at least one guiding structure. The flexibility of the belt allows a continuous adaption to the contour of the workpiece. For instance, the flexible belt can lie around the leading edge of a wind turbine blade adapting to the radius of curvature of the edge. This provides guiding of the cutting edge of the cutting apparatus alongside the adapted guiding structure comprised by the flexible belt and therefore independently of the shape of the workpiece.

To obtain such a flexibility, it may be provided that the flexible belt consists of a polymer material. The polymer material, for instance a hard plastic material, has the ability to adapt to the contour of the workpiece and provides durability of the guiding structure also after repeated usages of the alignment tool and the accompanying bending of the flexible belt.

A typical embodiment of the invention may comprise that the guiding structure is realized by at least one groove and/or at least one edge of the flexible belt for guiding the cutting edge of the cutting apparatus. Due to the flexibility of the belt, the groove and/or the edges allow guidance of the cutting edge according to the contour of the workpiece so that precise cuts can be set using the cutting apparatus. In particular, it is possible to cut precisely alongside the entire leading edge of a rotor blade as the groove and/or the edges used for guiding lie also tightly around the leading edge.

To reduce the wear of the guiding structure during operation, it may be provided that at least one edge of the belt and/or at least one edge of a groove are reinforced. This prevents the guiding structure from being damaged by the cutting edge of the cutting apparatus during operation. Especially, it is possible that side edges of the belt and all edges of the groove are reinforced.

Preferably, the reinforcement of the edges is provided by a thickening of the belt material or by addition of other material, especially metal sheet. The thickness of the thickened material or the metal sheet is chosen so that the reinforcement is also flexible maintaining the ability of the guiding structure to adapt to the contour of the workpiece. The usage of metal sheet provides thereby both flexibility when the guiding structure is turned over a workpiece, and stability against damages during a cutting procedure.

For fixing the alignment tool to the workpiece, it may be provided that the at least one fixation means comprises at least one suction cup, adhesive element, and/or adhesive portions. By the fixation means, the alignment tool can be attached to the workpiece reversibly so that it can be removed after finishing the treatment of the workpiece. The usage of one or more suction cups allows fixation on the workpiece granting stable support of the alignment tool and especially of the guiding structure, which is kept fixed in the intended position on the workpiece, which is targeted for the treatment. Preferably, the suction cups provide a hook or a loop on their upside. Adhesive elements and/or adhesive portions as fixation means can be provided at areas of the alignment tool, which are in contact with the workpiece, when the alignment tool is mounted, to ensure that the alignment tool does not get out of place during cutting, since the adhesive elements or adhesive portions increase the fixation of the alignment tool on the workpiece and prohibit therefore slipping of the alignment tool. The adhesive element and/or the adhesive portions can be used especially in combination with the suction cups or with a clamp arrangement, as described below.

A typical embodiment of the invention may comprise that the at least one fixation means comprises a clamp arrangement. Preferably, the clamp arrangement is adjustable to the shape of the workpiece allowing fixation of the alignment tool in any position on the workpiece by attachment of the clamp arrangement. A clamped alignment tool is reversibly attached to the workpiece and can be removed by releasing the clamp arrangement.

It may be provided that the clamp arrangement comprises to clamping elements connected by a frame component. The clamping elements are in contact with the workpiece while the frame component connects and supports the two clamping elements. Preferably, the frame component is bent in such way that the clamp arrangement can be attached to the trailing side of a wind turbine rotor blade without a physical contact to the rim of the trailing edge. In this way, a stable and releasable fixture of the aligning tool on the workpiece is obtained.

A preferred embodiment of the invention may comprise that the at least one fixation means is connected to the guiding structure by at least one rope, chain, hook-and-loop fastener and/or tension belt. A firm but reasable connection between the alignment tool and the workpiece is obtained by tensioning of the rope, chain, hook-and-loop fastener, and/or tension belt. The connection between the fixation means and the guiding structure ensures that the entire alignment tool is kept in position allowing the guiding structure to be hold in place by the fixation means. Preferably, at least two ends of the guiding structure are connected to a fixation means. It is especially desirable that for instance two of the ends of the guiding structure are connected to one of the clamping elements of a clamp arrangement or to one suction cup each.

For a cutting arrangement according to the embodiments of the invention, it may be provided that it comprises an alignment tool exhibiting one or more of the discussed features and a cutting apparatus with a cutting edge. Thereby, the cutting arrangement comprises the necessary tools to conduct the treatment of a workpiece as the alignment tool, which comprises the respective guiding structure, guides the cutting edge of the cutting apparatus for the treatment of the workpiece.

A further embodiment of the cutting arrangement may comprise that the cutting edge of the cutting apparatus comprises a strained metal wire, in which the strained metal wire is preferably wrapped by at least one additional metal wire. In particular, the metal wire is mounted in a frame which applies the tension to the wire. The frame may comprise for instance handle means for manual operation of the cutting apparatus to cut ductile material by alternating forward and backward movements of the cutting apparatus additionally causing heat input to the cut by friction. An additional metal wire, which may be wrapped as a tight helix around the circumference of a metal wire mounted in the frame causes an increased friction and therefore an increased heat input to obtain a higher abrasion of the material subject to cutting.

A method of a treatment of a workpiece using a cutting arrangement according to the embodiments of the invention may comprise the steps:
provision of the workpiece,
attachment of the alignment tool to the workpiece,
treatment of the workpiece using the cutting apparatus, in which the cutting edge of the cutting apparatus is guided by the at least one guiding structure of the alignment tool.

The attachment of the alignment tool to the workpiece may occur by using the fixation means of the alignment tool to fix the alignment tool in such way that the guiding structure of the alignment tool provides guiding of the cutting edge at the intended location. Subsequent to the attachment, the workpiece may be treated using the cutting apparatus obtaining the required position by guiding of the cutting edge.

In a preferred embodiment of the method dedicated for cutting through a leading edge protection shell of a wind turbine rotor blade, it may be provided that the alignment tool is wrapped around the circumference of the rotor blade, in which the attachment of the alignment tool is provided by the fixation means of the alignment tool and in which the guiding structure of the alignment tool embraces a leading edge of the rotor blade to provide guidance for the cutting edge of the cutting apparatus. Hereby, especially repair or replacement of ductile and robust leading edge protection material can be conducted for instance by partial replacement of damaged shell protection material. The alignment tool can be attached at any place on the rotor blade adapting to the local cross sectional shape of the rotor blade with the fixation means oriented towards the trailing edge of the rotor blade. Especially, the alignment tool can be fixed without damaging the tapered trailing edge of the rotor blade while the guiding structure adapts to the shape of the leading edge of the rotor blade by wrapping around. Due to the fixation of the alignment tool, slipping of the guiding structure is avoided during treatment of the wind turbine rotor blade.

BRIEF DESCRIPTION

Figure 2:
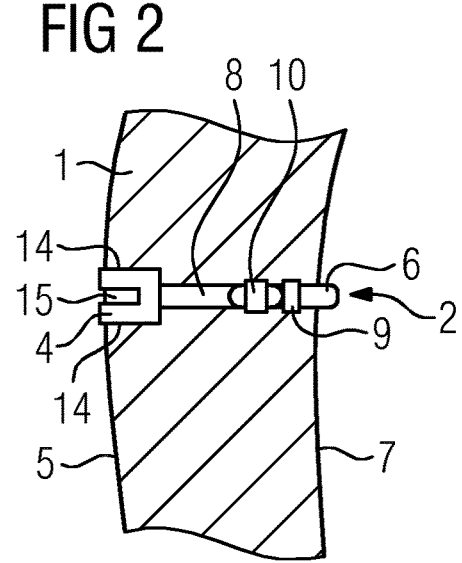
Figure 3:
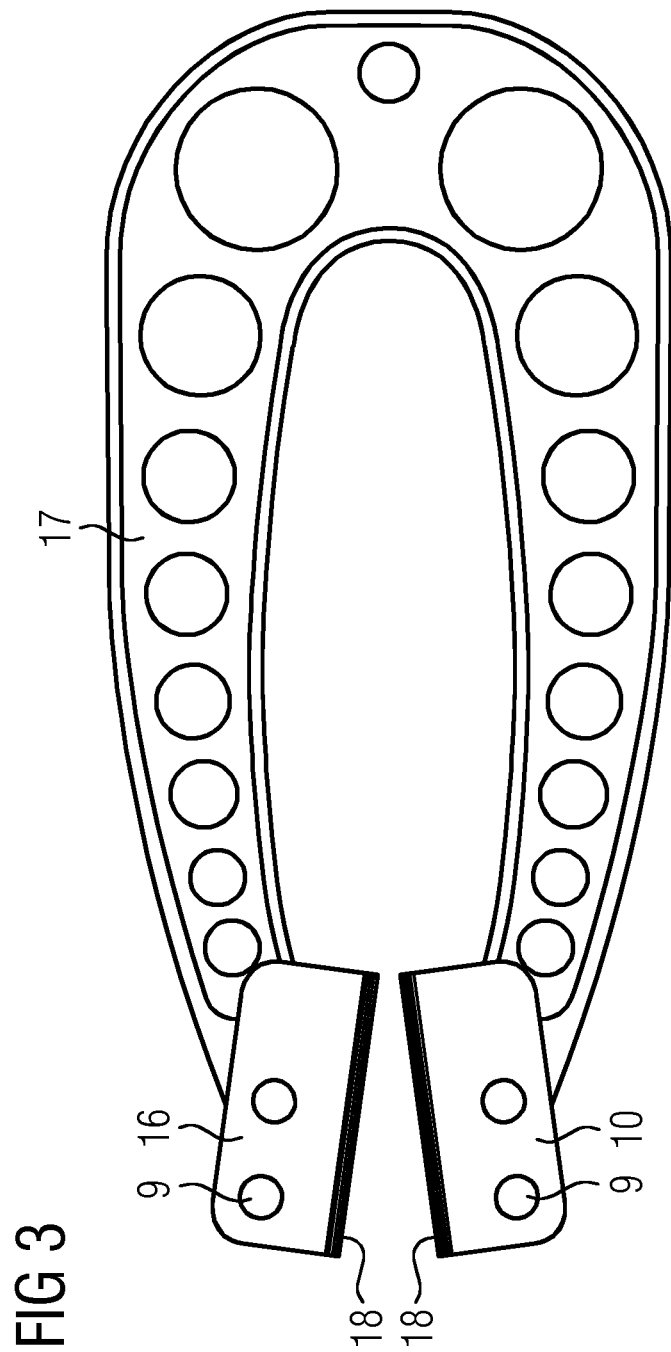

Some of the embodiments will be described in detail, with reference to the following figures, wherein like designations denote like members, wherein:

FIG. 1 a sectional side view of a wind turbine rotor blade with a cutting arrangement according to the invention comprising an alignment tool attached to the rotor blade and a cutting apparatus;

FIG. 2 a top view on a wind turbine rotor blade with an alignment tool according to the invention attached thereto;

FIG. 3 a detail view on a clamping arrangement of an alignment tool according to the invention;

FIG. 4 a sectional side view of a wind turbine rotor blade with an alternative embodiment of an alignment tool attached thereto; and FIG. 5 a detail view on a guiding structure of an alignment tool according to the invention.

DETAILED DESCRIPTION

FIG. 1 depicts a sectional view of a wind turbine rotor blade 1 and a cutting arrangement comprising an alignment tool 2 attached to the wind turbine rotor blade 1 and a cutting apparatus 3. The alignment tool comprises a flexible belt 4 which is bent over a leading edge 5 of the rotor blade 1, a fixation means 6 which is attached to a trailing edge 7 of the rotor blade 1 and which is connected by tension belts 8 to the flexible belt 4. The tension belts 8 are attached to the flexible belt 4 for instance by gluing or riveting. To the fixation means 6, the tension belts 8 are fixed by turning around loops 9 and the tension belts 8 can be tensioned by making use of a buckle 10. The fixation means 6 fixes the alignment tool 2 on the wind turbine rotor blade 1 and by the tension of the tension belts 8 also the flexible belt 4 is fixed at the leading edge 5 of the rotor blade 1.

This fixation of the alignment tool 2 is independent of the shape or the contour of the rotor blade 1 so that the alignment tool 2 can be attached at any place necessary on the wind turbine rotor blade 1.

The flexible belt 4 comprises guiding structures to guide a cutting edge 12 of the cutting apparatus 3. In this embodiment, the cutting edge 12 is a strained metal wire. The strain is applied to the metal wire through a frame 11 of the cutting apparatus 3. To allow manual operation of the cutting apparatus 3, the frame 11 comprises a handle means 13. A treatment of the rotor blade 1 can occur by the cutting apparatus 3, in which the cutting edge 12 is guided by the guiding structures of the flexible belt 4. After the treatment, the alignment tool 2 can be removed from the rotor blade 1 by releasing the tension of the tension belts 8. To ensure the flexibility of the flexible belt 4, which allows the adaption of the tension belt 4 to the leading edge 5 independently on the radius of curvature, the flexible belt 4 is made of a polymer material, like for instance hard plastic material.

In FIG. 2, a top view of an alignment tool 2 attached to a wind turbine rotor blade 1 is shown. The depicted situation corresponds to FIG. 1. The alignment tool 2 comprises a flexible belt 4, which is bent around the trailing edge 5 of the rotor blade 1. The flexible belt comprises guiding structures that are realized by its edges 14 and a groove 15. Upon operation, the cutting edge 12 of the cutting apparatus 3 is guided by either one of the edges 14 or the groove 15. This guidance allows precise cuts for instance in leading edge protection material which is applied to the leading edge 5 of the rotor blade 1 and which is subject to a treatment using the cutting apparatus 3. A fixation of the flexible belt 4 is provided through the fixation means 6 and the tension belts 8. In a tensioned state of the tension belts 8, the flexible belt 4 is immobilized and fixed in its position at the leading edge 5. The fixation means 6 is realized as a clamp arrangement in this example.

FIG. 3 shows a detailed view on a clamp arrangement used as fixation means 6 comprising clamping elements 16 and a frame component 17. Frame component 17 connects the two clamping elements 16 and is shaped in such a way, that the clamp does not touch the rim of the trailing edge 7 of the rotor blade 1 in its attached state. The clamping elements 16 may comprise loops 9 to turn a rope, a chain, a hook-and-loop fastener, or a tension belt which is used to connect the clamp arrangement to a flexible belt 4. Additionally, the clamping elements 16 may comprise a rubber lip 18 to protect the surface of a rotor blade while mounting the clamp arrangement. To ensure the ability and to obtain a light weight, the frame component 17 may comprise a double T-shaped cross sectional area as well as one or more holes for weight reduction.

FIG. 4 shows an alternative embodiment of an alignment tool 2 comprising a flexible belt 4, two suction cups 20, and two hook-and-loop fasteners 19. One end of the hook-and-loop fasteners 19 is attached to the flexible belt 4 and the other end is wrapped around loops 21, which are attached to the suction cups 20, and enable tensioning of the hook-and-loop fasteners. To ensure additional fixation of the alignment tool 2 on the rotor blade 1, both the flexible belt 4 and the hook-and-loop fasteners 19 may comprise adhesive elements and/or 0 adhesive portions at their surfaces located towards the rotor blade 1. Also in this embodiment, adaption to any shape and contour of the workpiece is obtained by using flexible material like hard plastic for the flexible belt 4 as well as by the usage of the suction cups 20 as an adaptable fixation of the alignment tool 2.

FIG. 5 depicts a detail view on a flexible belt 4. The flexible belt 4 comprises two loops 22 at its edges to allow the connection of the flexible 4 to tension belts 8 or to hook-and-loop fasteners, ropes, or chains. The loops 22 can be attached to the flexible belt 4 for instance by riveting. The flexible belt 4 comprises guiding structures realized by its edges 14 as well as by the groove 15. Both the edges 14 and the groove 15 can be used to guide the cutting edge 12 of the cutting apparatus 3. To reduce the wear of the flexible belt and to prevent it from damages that could occur during cutting, both the edges 14 as well as the edges 23 of the groove 15 can be reinforced, for instance by a thickening of the hard plastic material of the flexible belt 4 or by the addition of other material like for instance metal sheet. Both the thickening of the material and/or the application of the metal sheet occur with a thickness which does not inhibit the flexibility of the belt to maintain its adaption to the shape or the contour of the workpiece. For precise cutting of for instance the leading edge protection material of a wind turbine rotor blade 1, either of the guiding structures of the flexible belt 4 is moved into position and the alignment tool is fixed making use of its fixation means 6. Slipping of the flexible belt 4 is prohibited by applying tension to for instance the tension belts 8. The leading edge protection material can then be cut using the cutting apparatus 3 with its cutting edge 12 guided by the guiding structures of the flexible belt 4.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for treatment using a cutting arrangement, comprising:
   providing a rotor blade of a wind turbine;
   attaching an alignment tool to the rotor blade, the alignment tool comprising:
      at least one fixation means for fixing the alignment tool to proximate a trailing edge of the rotor blade, wherein the at least one fixation means is a structure attachable to a first surface and a second opposing surface of the rotor blade; and
      at least one guiding structure operably connected to the fixation means, wherein the guiding structure is configured to embrace the leading edge of the rotor blade and includes at least one groove or at least one edge that provides guidance for a cutting edge of a cutting apparatus; and
   treating the rotor blade using the cutting apparatus, in which the cutting edge of the cutting apparatus is guided by the at least one guiding structure of the alignment tool.

2. The method according to claim 1, further comprising cutting through a leading edge protection shell of the wind turbine rotor blade, wherein the alignment tool is wrapped around a cross section of the rotor blade.

3. The method according to claim 1, further comprising fixing the alignment tool proximate the trailing edge of the rotor blade.

4. The method according to claim 3, further comprising attaching a portion of the fixation means to a first surface of the rotor blade and attaching a portion of the fixation means to a second opposing surface of the rotor blade.

5. The method according to claim 1, connecting, by at least one rope, chain, hook-and-loop fastener and/or tension belt, at least two ends of the guiding structure to the at least one fixation means.

6. The method according to claim 5, wherein the at least one fixation means includes a first loop proximate the first surface of the rotor blade and a second loop proximate the second opposing surface of the rotor blade, the method further comprising:
 attaching a first end of the guiding structure to a first rope, chain, hook-and-loop fastener and/or tension belt;
 attaching the first rope, chain, hook-and-loop fastener and/or tension belt to the first loop;
 attaching a second end of the guiding structure to a second rope, chain, hook-and-loop fastener and/or tension belt; and
 attaching the second rope, chain, hook-and-loop fastener and/or tension belt to the second loop.

7. The method according to claim 1, further comprising reinforcing the at least one groove or the at least one edge with a reinforcement of thickening material.

8. The method according to claim 1, further comprising adhering the at least one fixation means to the rotor blade.

\* \* \* \* \*